United States Patent Office 3,378,497
Patented Apr. 16, 1968

3,378,497
STABILIZED POLYOLS
William M. Lanham, Charleston, W. Va., assignor to Union Carbide Corporation, a corporation of New York
No Drawing. Filed Feb. 8, 1965, Ser. No. 431,199
12 Claims. (Cl. 252—182)

The invention relates to the stabilization of polyols that contain catalysts. In a particular aspect, the invention relates to the use of epoxides to stabilize polyol compositions that contain certain phosphorus compounds and catalysts for promoting urethane-forming reactions.

Urethane polymers are widely employed to produce cellular products (i.e., foams), elastomers, coatings, and the like. In many of the applications in which urethane polymers are employed, some degree of flame resistance is desired. One of the best means for improving flame resistance is to include a phosphorus-containing composition in the urethane polymer. The phosphorus-containing composition is usually a reactant such as a polyol, but it can also be a non-reactive additive.

In marketing intermediates for producing urethane polymers, it is frequently desirable to include the various components in as few packages as possible. Thus, there could be included in one package an admixture of one or more polyols, one or more catalysts, blowing agent when a foam is to be prepared, and the like, and in another package an admixture of an isocyanate and a surfactant. One such admixture that is of commercial importance for producing flame resistant urethane polymers contains one or more polyols, one or more phosphorus-containing compositions, and a catalyst for accelerating the polymer-forming reactions. However, it has been found that certain phosphorus-containing compounds that are highly effective in imparting flame resistance to urethane polymers will deactivate the catalysts upon storage. This causes unpredictability in the performance of the polyol admixture, and necessitates either a change in formulation or the addition of more catalyst just before use. In many cases neither of these expedients is desirable.

The present invention is based on the discovery that a small amount of an epoxide will prevent phosphorus-containing compositions from deactivating the catalysts which accelerate the urethane polymer-forming reactions. Thus, the invention provides a stabilized composition that comprises a polyol, a phosphorus-containing composition, a catalyst for accelerating the urethane polymer-forming reactions, and a small amount of an epoxide.

The stabilized compositions of the invention can contain a wide variety of polyols. For instance, one or more of the following classes of polyols can be employed:

(a) Hydroxyl-terminated polyesters and polyester-ethers;
(b) Polyhydroxyalkanes and alkylene oxide adducts thereof;
(c) Trialkanolamines and alkylene oxide adducts thereof;
(d) Alcohols derived from mono- and polyamines by addition of alkylene oxides;
(e) Non-reducing sugars and sugar derivatives and alkylene oxide adducts thereof;
(f) Alkylene oxide adducts of aromatic amine/phenol/aldehyde ternary condensation products;
(g) Alkylene oxide adducts of polyphenols;
(h) Polyetheramethylene glycols, and the like;
(i) Functional glycerides, such as castor oil.

Illustrative hydroxyl-terminated polyesters are those which are prepared by polymerizing a lactone (preferably, an epsilon-caprolactone) in the presence of an active hydrogen-containing starter as disclosed in U.S. Patent 2,914,556. Polyesters from adipic acid and diols such as ethylene glycol, propylene glycol, diethylene glycol, dipropylene glycol, and the like, and triols such as 1,1,1-trimethylolpropane, 1,2,6-hexanetriol, glycerol, and others, are also useful. Copolymers of lactones and alkylene oxides can also be used with good results. Such copolymers are described in U.S. Patent No. 2,962,524.

Illustrative polyhydroxyalkanes include, among others ethylene glycol, propylene glycol, 1,3-dihydroxypropane, 1,3 - dihydroxybutane, 1,4 - dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like. The alkylene oxide adducts of the above-exemplified polyhydroxyalanes can also be employed, preferably the ethylene oxide, propylene oxide, the epoxybutane, or mixtures thereof, adducts of said polyhydroxyalkanes.

Another useful class of polyols which can be employed are the trialkanolamines and the alkylene oxide adducts thereof. Illustrative trialkanolamines include triethanolamine, triisopropanolamine, and tributanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides having 2 to 4 carbon atoms, for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4-, 1,5-, and 1,6-hexanediamine, phenylenediamines, toluenediamine, naphthalenediamines, and the like. Among the compounds of the above groups which are of particular interest are, among others, N,N,N',N'-tetrakis(2 - hydroxyethyl)ethylenediamine, N,N,N',N'-tetrakis(2 - hydroxypropyl)ethylenediamine, N,N,N',N'',N''-pentakis(2 - hydroxypropyl)diethylene trianise, phenyldiisopropanolamine and higher alkylene oxide adducts of aniline, and the like. Others which deserve particular mention are the alkylene oxide adducts of aniline or substituted-aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, polyol glycosides such as ethylene glycol glucoside, propylene glycol glucoside, glycerol glucoside, 1,2,6-hexanetriol glucoside, and the like.

A still further useful class of polyols are the alkylene oxide adducts of polyphenols wherein the alkylene oxides have from 2 to 4 carbon atoms. Among the polyphenols which are contemplated are found, for example, bisphenol A, bisphenol F, condensation products of phenol and formaldehyde, more particularly the novolac resins, condensation products of various phenolic compounds and acrolein, the simplest members of this class being the 1,1,3 - tris(hydroxyphenyl)propanes, condensation products of various phenolic compounds and glycoxal, glutaraldehyde, and other dialdehydes, the simplest members of this class being the 1,1,2,2-tetrakis(hydroxyphenyl)ethanes, and the like.

Another desirable class of polyols are the alkylene oxide adducts, preferably the ethylene oxide, 1,2-epoxypropane, epoxybutane, and mixtures thereof, adducts of aromatic amine/phenol/aldehyde ternary condensation products. The ternary condensation products are prepared by condensing an aromatic amine, for instance aniline, toluidine, or the like, a phenol such as phenol, cresol, or the like, and an aldehyde preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propylene-ethylene oxide adducts of aniline/phenol/formaldehyde ternary condensation products deserve particular mention.

Another useful class of polyols are the polytetramethylene glycols, which are prepared by polymerizing tetrahydrofuran in the presence of an acidic catalyst.

Also useful are castor oil and alkylene oxide adducts of castor oil.

The polyol or polyol mixture employed can have hydroxyl numbers which vary over a wide range. In general, the hydroxyl numbers of the polyols employed in the invention can range from about 20, and lower, to about 1000, and higher, preferably, from about 30 to about 600, and more preferably, from about 35 to about 450. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where $OH$ = hydroxyl number of the polyol
$f$ = average functionality, that is average number of hydroxyl groups per molecule of glycol
$M.W.$ = average molecular weight of the polyol.

The exact polyol employed depends upon the end-use of the urethane product. For example, when used to prepare foams, the molecular weight and the hydroxyl number are selected properly to result in flexible, semi-flexible, or rigid foams. The polyol preferably possesses a hydroxyl number of from about 200 to about 1000 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the polyols that can be employed.

The phosphorus-containing compositions that are employed in the invention are the tertiary phosphites including the tertiary polyphosphites, the phosphonates, and the polyphosphonates. Among the tertiary phosphites that can be employed are the tris(polyalkylene glycol) phosphites that can be produced by reacting three or more moles of a polyalkylene glycol with one mole of, for example, triphenyl phosphite in an ester exchange reaction as described in U.S. Patent No. 3,009,939. Among the tris(polyalkylene glycol) phosphites that deserve particular mention are tris(dipropylene glycol) phosphite and other tris(polypropylene glycol) phosphites, tris(diethylene glycol) phosphite, and the like. The tris (polyalkylene glycol) phosphites can be represented by Formula I:

I 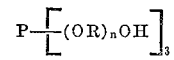

wherein each R individually represents an alkylene group of from 2 to 4 carbon atoms, and wherein $n$ represents a number having an average value of at least 2 and up to about 50 or more. The preferred tris(polyalkylene glycol) phosphites are the tris(polypropylene glycol) phosphites. Tris(dipropylene glycol) phosphite is more preferred.

A second useful class of tertiary phosphites are the poly(alkylene glycol phosphite) esters that can be prepared by reacting from about two to about three moles of polyalkylene glycol with one mole of, for example, triphenyl phosphite in an ester exchange reaction as described in U.S. Patent No. 3,081,331. These poly(alkylene glycol phosphite) esters can be represented by Formula II:

II 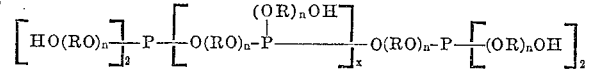

wherein each R individually represents an alkylene group of from 2 to 4 carbon atoms, wherein $n$ is a number having an average value of at least 2 and up to 50 or more, and wherein $x$ is a number having an average value of from zero to about twenty or more. The preferred poly(alkylene glycol phosphite) esters are those that can be prepared by reacting dipropylene glycol with a trihydrocarbyl phosphite such as triphenyl phosphite in a molar ratio of from about 2.1 to 2.5 moles of dipropylene glycol per mole of trihydrocarbyl phosphite. Such esters are represented by Formula II when R is 1,2-propylene and $n$ is 2. Illustrative of such preferred compositions are dipropylene glycol pentol triphosphite (R is 1,2-propylene, $n$ is 2, and $x$ is 1 in Formula II) and dipropylene glycol heptol pentaphosphite (R is 1,2-propylene, $n$ is 2, and $x$ is 3 in Formula II).

A further class of useful tertiary phosphites are those that are represented by Formula III:

III 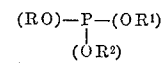

where R, R¹ and R² can equal alkyl, aralkyl, haloalkyl, aryl, alkaryl, haloaryl and 2 R's together represent a 2 or 3 carbon chain in a 5- or 6-membered ring. Examples include trimethyl phosphite, triethylphosphite, tributyl phosphite, trioctyl phosphite, tribenzyl phosphite, dibutyl phenyl phosphite, tris(2-chloroethyl) phosphite, tris(chloropropyl) phosphite, tris(4-chlorobutyl) phosphite, tris (2-bromoethyl) phosphite, tris(2,3-dibromopropyl) phosphite, tris(dichloropropyl) phosphite, triphenyl phosphite, tris(4 - chlorophenyl) phosphite, tris(2,4,6 - trichlorophenyl) phosphite, tricresyl phosphite, tris(meta-xylyl) phosphite, tris(p-tert-butyl) phosphite, 2-phenoxy-1,3,2-dioxaphospholanes, and the like.

Pentaerythritol phosphites such as those described in U.S. Patent 3,141,032 are also useful in this invention.

An additional class of tertiary phosphites are those that can be prepared by reacting a tertiary phosphite that is within the definition of Formula III (triphenyl phosphite, for example) with a polyol. Any of the polyols enumerated above as (a) through (i) can be used for this purpose to produce compounds in which one, two or three of the R, R¹ or R² variables in Formula III are replaced with the polyol reactant. Such phosphites are disclosed in U.S. Patents 3,144,419 and 3,121,082.

The phosphorus-containing composition can also be a phosphonate. For example, alkylene oxide adducts of phosphonic acids can be employed. Such adducts can be represented by Formula IV.

IV
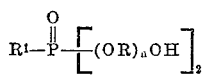

wherein R¹ is a monovalent hydrocarbon group such as alkyl, haloalkyl, aryl, haloaryl, alkaryl, aralkyl, or the like, of up to 20 carbon atoms, wherein R is an alkylene group, and wherein $n$ is a number having an average value of at least 1 and up to 50 or more. Particularly useful phosphonates include the propylene oxide adducts of benzenephosphonic acid, butylphosphonic acid, benzylphosphonic acid, tolylphosphonic acid, chloromethylphosphonic acid, trichloromethylphosphonic acid, chlorophenylphosphonic acid, and the like.

Another useful class of phosphonates are the O,O'-disubstituted N,N-bis(hydroxyalkyl)aminoalkylphosphonates that can be represented by Formula V:

V
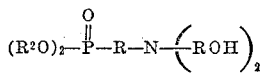

wherein each R² individually represents alkyl, aryl, hydroxyalkyl, or haloalkyl of up to about 10 carbon atoms, and wherein each R individually represents alkylene of up to six carbon atoms. The preparation of these phosphonates is described in U.S. Patent No. 3,076,010. Specific examples include O,O'-diethyl N,N-bis(2-hydroxyethyl)aminomethylphosphonate, O,O'-bis(2-chloroethyl) N,N-bis(2-hydroxyethyl)aminomethylphosphonate, O,O'-diphenyl N,N-bis(2-hydroxypropyl)aminomethylphosphonate, and O,O'-bis(4-hydroxybutyl) N,N-bis(2-hydroxyethyl)aminoisopropylphosphonate.

Also useful are the diphosphonates that can be represented by Formula VI:

VI
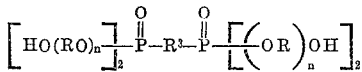

wherein R represents alkylene of from 2 to 4 carbon atoms, wherein R³ represents lower alkylene of up to about 10 carbon atoms, and wherein $n$ represents a number having an average value of at least 1 and up to 50 or more. The production of these phosphonates is described in U.S. Patent No. 3,092,651. Of particular interest are the phosphonates represented by Formula VI when R is 1,2-propylene and $n$ is 2. Specific illustrative examples of diphosphonates and polyphosphonates that can be produced by the method disclosed in U.S. Patent 3,092,651 include bis(dipropylene glycol) 2-hydroxypropoxypropanephosphonate, bis(diethylene glycol) hydroxyethoxyethanephosphonate, bis(dipropylene glycol) hydroxymethanephosphonate, bis(dipropylene glycol) α-hydroxyethanephosphonate, tris(dipropylene glycol) bis(hydroxymethane)diphosphonate, and tris(dipropylene glycol) bis(α-hydroxyethane)diphosphonate.

The polyol compositions of the invention also contain a catalyst for accelerating the reactions that form urethane polymers, i.e., the reaction of the polyol with an organic polyisocyanate. The catalysts contemplated are the organometallic compounds such as the organometallic compounds of Bi, Pb, Ti, Fe, Sb, U, Cd, Co, Th, Al, Ag, Zn, Ni, Ce, Mo, Va, Cu, Mn, Zr, and Sn. Preferably, the catalyst is an organotin compound, and more preferably the catalyst is an organotin compound plus a tertiary amine. The organotin compounds are characterized by having at least 1 direct carbon to tin valence bond, any remaining bonds to tin being to halogen, oxygen, hydrogen, sulfur, nitrogen, or phosphorus. Among the many organotin compounds that can be employed in the invention are the following:

(A) Tin compounds having four carbon to tin bonds such as tetramethyltin, tetraethyltin, tetrapropyltin, tetrabutyltin, tetraoctylin, tetralauryltin, tetrabenzyltin, tetrakis(2-phenylethyl)tin, tetraphenyltin, tetraparatolyltin, tetravinyltin, tetrallyltin, tetrachloromethyltin, tetramethanesulfonylmethyltin, tetra-para-methoxy-phenyltin, tetra-para-nitrophenyltin, as well as unsymmetrical compounds as exemplified by 2-cyanoethyltributyltin, dibutyldiphenyltin and various addition products of alkyl, aryl and aralkyltin hydrides with unsaturated organic compounds such as acrylonitrile, allyl cyanide, crotonitrile, acrylamide, methyl acrylate, allyl alcohol, acroleindiethyl acetal, vinyl acetate, styrene, and the like;

(B) Tin compounds having $n$ carbon to tin bonds and $4-n$ bonds from tin to halogen or hydrogen atoms or hydroxyl groups in which $n$ is an integer in the range of from 1 to 3, such as trimethyltin chloride, tributyltinchloride, trioctyl chloride, triphenyltin chloride, trimethyltin bromide, tributyltin fluoride, triallyltin chloride, tributyltin hydride, triphenyltin hydride, trimethyltin hydroxide, tributyltin hydroxide, dimethyltin dichloride, dibutyltin dichloride, dioctyltin dichloride, bis(2-phenylethyl)tin dichloride, diphenyltin dichloride, divinyltin dichloride, diallyltin dibromide, diallyltin diiodide, dibutyltin difluoride, bis(carboethoxymethyl)tin diiodide, bis(1,3-diketopentane)tin dichloride, dibutyltin dihydride, butyltin trichloride and octyltin trichloride;

(C) Tin compounds having two carbon to tin bonds and a double bond from tin to oxygen or sulfur, such as dimethyltin oxide, diethyltin oxide, dibutyltin oxide, dioctyltin oxide, dilauryltin oxide, diphenyltin oxide and diallyltin oxide, all prepared by hydrolysis of the corresponding dihalides, as well as bis-2-phenylethyltin oxide,

[HOOC(CH₂)₅]₂SnO,
[CH₃OCH₂(CH₂OCH₂)ₓ₋₁CH₂]₂SnO,
[CH₃OCH₂(CH₂OCH₂)ₓ₋₁CH₂O(CH₂)₅]₂SnO and dibutyltin sulfide, the $x$'s being whole integers;

(D) Tin compounds having $n$ carbon to tin bonds and 4-n bonds from tin to oxygen, sulfur, nitrogen or phosphorus linking organic radicals, $n$ being an integer of from 1 to 3, such as tributyltin methoxide, tributyltin butoxide, tributyltin acetate, tributyltin N-piperazinylthiocarbonylmercaptide, tributyltin phosphorus dibutoxide, prepared as indicated immediately below:

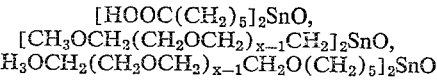

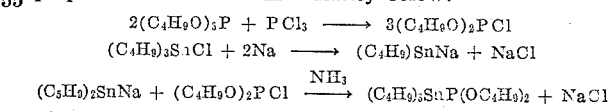

dibutyltin dibutoxide, (C₄H₉)₂Sn[OCH₂(CH₂OCH₂)ₓ₋₁CH₂CH₃]₂

2,2-dibutyl-1,3,2-dioxastannolane, 2,2-dibutyl-4-methyl-1,3,2-dioxaphospholane, dibutyl bis(O-acetylacetonyl)tin, dibutyltin bis(octyl maleate), dibutyltin bis(thiododecoxide), dibutyltin bis(octyl thioglycolate), dibutyltin bis (N-morpholinylcarbonyl-methylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinylthiocarbonylmercaptide), dioctyltin bis(N-piperazinylthiocarbonylmercaptide), octyltin tris(thiobutoxide), butyltin triacetate, methylstannonic acid, ethylstannonic acid, butylstannonic acid, octylstannonic acid, HOOC(CH$_2$)$_5$-SnOOH, (CH$_3$)$_3$N(CH$_2$)$_5$SnOOH,
CH$_3$OCH$_2$(CH$_2$OCH$_2$)$_{x-1}$CH$_2$SnOOH and
CH$_3$OCH$_2$(CH$_2$OCH$_2$)$_{x-1}$CH$_2$O(CH$_2$)$_5$SnOOH in which the $x$'s are positive integers.

(E) Polystannic compounds having carbon to tin bonds and preferably also bonds from tin to halogen, hydrogen, oxygen, sulfur, nitrogen or phosphorus, such as HOOSn(CH$_2$)$_x$SnOOH and
HOOSnCH$_2$(CH$_2$OCH$_2$)$_x$CH$_2$SnOOH, the $x$'s being positive integers, bis-trimethyltin, bis-triphenyltin, bis-tributyl distannoxane, dibutyltin basic laurate, dibutyltin basic hexoxide and other polymeric organo-tin compounds containing carbon to tin bonds and preferably also bonds, e.g., those having repeating

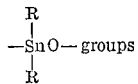  groups dimers and trimers of (R$_2$SnY)$_n$ and the like in which the R's may be alkyl, aryl or aralkyl radicals and the Y's are chalcogens, as well as many other organo-tin compounds heretofore proposed as heat and light stabilizers for chlorinated polymers and available commercially for this purpose.

From the above description it is seen that a great many organotin compounds can be used in the invention. It is pointed out that the tin in said compounds ordinarily has 4 valence bonds, i.e., the organotin compounds are ordinarily stannic compounds rather than stannous.

The tertiary amines that can be employed as catalysts along with the organotin compounds are illustrated by compounds such as trimethylamine, triethylamine, N-methylmorpholine, N-ethylmorpholine, N,N-dimethylbenzylamine, N,N-dimethylethanolamine, N,N,N',N',-tetramethyl-1,3-butanediamine, triethanolamine, 1,4-diazabicyclo[2.2.2]octane, 1,2,4-trimethylpiperazine, bis-(dimethylaminomethyl)amine, N,N,N',N'-tetraalkyl-1,3-propanediamine, bis[2-(N,N-dimethylamino)ethyl] ether, and the like. Also, the tertiary amine catalyst can be an alkylene oxide adduct of an aliphatic amine such as the propylene oxide and mixed propylene oxide-ethylene oxide adducts of ethylenediamine, diethylenetriamine, triethanolamine, and the like.

The polyol compositions of the invention contain one or more epoxides. The epoxide can be a 1,2-epoxide (i.e., a vicinal epoxide) or a 1,3-epoxide. The vicinal epoxides are preferred. Among the many classes of epoxides that can be employed are the alkylene oxides such as ethylene oxide, 1,2-propylene oxide, 1,3-propylene oxide, 1,2-butylene oxide, 2,2-butylene oxide, isobutylene oxide, epoxycyclohexane, epoxyoctane, epoxydecane, epoxydodecane, epoxytetradecane, epoxyhexadecane, and the like. Also useful are halogenated alkylene oxide such as epichlorohydrin, chloroprene oxide, and the like. Other useful epoxides are butyl glycidyl ether, phenyl glycidyl ether, styrene oxide, 1-vinyl-2,3-epoxycyclohexane and didecyl 2,3-epoxytetrahydrophthalate.

Many classes of polyepoxides can be used in the invention. Among the useful polyepoxides there can be mentioned the diglycidyl ether of 2,2-bis(4-hydroxyphenyl) propane, the diglycidyl ether of bis(4-hydroxyphenyl) methane, vinylcyclohexene dioxide, bis(2,3-epoxycyclophentyl) ether, and the like.

Additional polyepoxides that are useful in the invention include those that are repreesnted by Formula VII:

VII 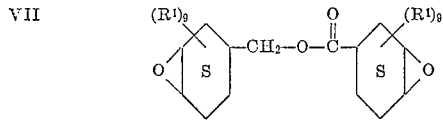

wherein each R$^1$ individually represents hydrogen or alkyl, preferably lower alkyl of from 1 to 4 carbon atoms. The preparation of these diepoxides is found in U.S. Patent No. 2,716,123. Among the diepoxides that are presented by Formula VII that deserve particular mention are the following compositions: 3,4-epoxycyclohexymethyl 3,4-epoxycyclohexanecarboxylate; 3,4-epoxy-1-methylcyclohexylmethyl 3,4-epoxy-1-methylcyclohexanecarboxylate; 3,4-epoxy-6-methylcyclohexylmethyl 3,4-epoxy-6-methylcyclohexane carboxylate; and the like.

A second class of polyepoxides that are useful in the invention are those diepoxides that are represented by Formula VIII:

VIII 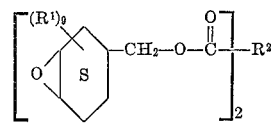

wherein each R$^1$ individually represents hydrogen or alkyl, preferably lower alkyl of from 1 to 4 carbon atoms, and wherein R$^2$ represents a divalent hydrocarbon group of from 0 to 10 carbon atoms. The preparation of the diepoxides that are represented by Formula VIII is found in U.S. Patent Nos. 2,750,395 and 2,863,881. Among the diepoxides that are represented by Formula VIII that deserve particular mention are the following compositions: bis(3,4-epoxy-6-methylcyclohexymethyl) adipate; bis-(3,4-epoxycyclohexymethyl) adipate; bis(3,4-epoxycyclohexylmethyl) oxalate; bis(3,4-epoxycyclohexylmethyl) succinate; bis(3,4-epoxy-6-methylcyclohexylmethyl) sebacate; bis(3,4-epoxycyclohexylmethyl) maleate; bis(3,4-epoxycyclohexylmethyl) terephthalate; and the like.

Another useful class of polyepoxides are those that are represented by Formula IX:

IX 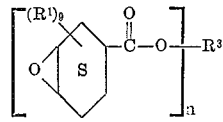

wherein $n$ is an integer having a value in the range of from 2 to 4, wherein each R$^1$ individually represents hydrogen or alkyl, preferably lower alkyl of from 1 to 4 carbon atoms, and wherein R$^3$ represents a saturated aliphatic group having a valence of $n$. The preparation of the polyepoxides that are represented by Formula IX is known, for example seen U.S. Patent Nos. 2,745,847 and 2,884,403. Representative epoxes that are within the scope of Formula IX are the following compositions: ethylene glycol bis(3,4-epoxycyclohexanecarboxylate); 2-ethyl-1,3-hexanediol bis(3,4-epoxycyclohexanecarboxylate); diethylene glycol bis(3,4-epoxy-6-methylcyclohexanecarboxylate); glycerol tris(3,4-epoxycyclohexanecarboxylate); pentaerythritol tetrakis(3,4-epoxycyclohexanecarboxylate); and the like.

A further class of polyepoxides that are useful in the invention are those that are represented by Formula X:

X 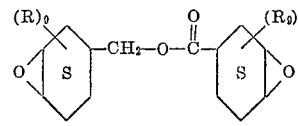

wherein each R individually represents hydrogen, alkyl, preferably lower alkyl of from 1 to 4 carbon atoms, or halogen, preferably chloro, bromo, or iodo, provided that at least one R is halogen. The preparation of the diepoxides that are represented by Formula X is disclosed in U.S. Patent No. 2,874,167. Among the diepoxides that are represented by Formula X that deserve particular mention are (1-bromo-3,4-epoxycyclohexane-1-yl)methyl 1-bromo-3,4-epoxycyclohexanecarboxylate, and the like.

The preferred epoxides for use in the invention are the vicinal epoxides that contain up to 30 carbon atoms and which contain no non-hydrocarbon moieties other than vicinal epoxide, ether oxygen, carbonyloxy, and chloro. The alkylene oxides are more preferred, and 1,2-propylene oxide is most preferred.

The proportions of the polyol and the phosphorus-containing compound can be varied widely. For instance, in the case where the phosphorus-containing compound is a polyol, no additional polyol need be present in the formulation. Preferably, however, the phosphorus-containing compound constitutes from about 1 weight percent to about 50 weight percent of the total weight of polyol plus phosphorus-containing compound. More preferred proportions are from about 10 weight percent to about 40 weight percent of phosphorus-containing compound, based on weight of polyol plus phosphorus-containing compound.

The catalyst is employed in catalytic amounts sufficient to promote the reaction of polyol with isocyanate. For example, the organotin compound can be employed in quantities of from about 0.01 weight percent to about 4 weight percent, based on weight of polyol. More preferably, the organotin compound is employed in quantities of from about 0.05 to about 2.0 weight percent, based on weight of polyol. Tertiary amine catalysts can be employed in similar amounts. Of course, when the tertiary amine is also a polyol (e.g., a propylene oxide adduct of diethylenetriamine), it can be used in much larger quantities than the amounts set forth above.

The epoxide is employed in a small amount sufficient to stabilize the polyol-catalyst system against loss of reactivity. For example, amounts in the range of from about 0.1 weight percent to about 10 weight percent can be used. More preferably, from about 0.5 to about 4 weight percent of epoxide is employed, percentages being based on weight of polyol.

The stabilized polyol compositions of the invention can contain many other components. For example, when the polyol is to be employed to produce urethane foams, foaming or blowing agents can be included in the polyol composition. Among such blowing agents are trichloromonofluoromethane, dichlorodifluoromethane, 1,1,1-trichloro-2,2,2-trifluoroethane, and the like. Additional components that can be present include fillers such as silica, additional flame-proofing agents such as antimony trioxide and poly(vinyl chloride), and the like.

The production of the stabilized polyol compositions of the invention can be by conventional methods such as by simply mixing the components in a suitable container. The polyol compositions are preferably stored in a closed container in order to exclude atmospheric moisture and oxygen from the air.

The stabilized polyols of the invention have wide utility in the preparation of urethane products. The polyols are particularly useful for producing urethane foams, especially rigid urethane foams. The production of such urethane products is well known in the art, for example, see Parts I and II of the text by Saunders and Frish, "Polyurethanes: Chemistry and Technology," Interscience Publishing Company, New York, N.Y.

The examples which follow illustrate various aspects of the invention. Certain of the materials that are used in the examples are identified as follows:

POLYOLS

Polyol A.—Produced by reacting an 80:20 (by weight) propylene oxide:ethylene oxide mixture with the ternary condensation product of phenol, aniline, and formaldehyde (in a molar ratio respectively of about 1.05:1.05:1) to produce a polyol having a hydroxyl number of about 320.

Polyol B.—Propylene oxide adduct of 95:5 (by weight) sorbitol:water mixture, the adduct having a hydroxyl number of about 490.

Polyol C.—Propylene oxide adduct of diethylenetriamine, the adduct having a hydroxyl number of about 700.

ISOCYANATE

Polyisocyanate A.—Produced by phosgenation of the condensation product of aniline and formaldehyde. Polyisocyanate A has an isocyanate equivalent weight of about 134 and an average molecular weight of about 390.

PHOSPHORUS COMPOUNDS

Phosphonate A.—O,O' - diethyl N,N - bis(2 - hydroxyethyl)-aminomethylphosphonate having a hydroxyl number of about 455.

DPG triphosphite.—Dipropylene glycol pentol triphosphite having a hydroxyl number of about 285.

DPG pentaphosphite.—Dipropylene glycol heptol pentaphosphite having a hydroxyl number of 255.

EMULSIFIER

Silicone Emulsifier A.—A block copolymer of the formula:

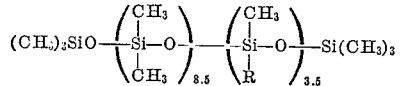

wherein R is a group of the formula

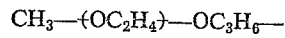

Examples 1–12

A series of polyol compositions were produced which had the following components:

| Component: | Parts by wt. |
|---|---|
| Polyol A | 39.0 |
| Polyol B | 39.0 |
| Phosphorus compound | 19.0 |
| Polyol C | 3.0 |
| Trichloromonofluoromethane | 26.0 |
| 1,4-diazabicyclo[2.2.2]octane (33% in dipropylene glycol) | 0.3 |
| Dibutyltin dilaurate | 0.1 |

The ability of 1,2-propylene oxide to stabilize the above polyol composition containing six different phosphorus compositions was evaluated. The evaluation was conducted by measuring the performance in a urethane foam-forming reaction of each of a series of 12 polyol compositions after various periods of storage. The 12 polyol compositions contained the following phosphorus compounds and the indicated quantity of propylene oxide:

| Example No. | Phosphorus Compound | Propylene Oxide, Parts by Weight |
|---|---|---|
| 1 | Tris(dipropylene glycol) phosphite | 1.0 |
| 2 | do | 0 |
| 3 | Phosphonate A | 1.0 |
| 4 | do | 0 |
| 5 | DPG Triphosphite | 1.0 |
| 6 | do | 0 |
| 7 | DPG Pentaphosphite | 1.0 |
| 8 | do | 0 |
| 9 | Tris(diethylene glycol) phosphite | 1.0 |
| 10 | do | 0 |
| 11 | Triethyl Phosphite | 1.0 |
| 12 | do | 0 |

Samples of each of the 12 polyol compositions were reacted with a mixture of Polyisocyanate A and Silicone Emulsifier A (98.5:1.5, by weight) immediately after preparation and after storage in closed containers for 1, 2 and 3 months at 50° C. and after 3 months at 25° C. Table I, below, displays the results of the evaluation, and shows the remarkable ability of propylene oxide to stabilize the polyol against loss of reactivity. The properties measured were viscosity of the polyol and the cream time, rise time, tack-free time, and foam height of the foams prepared by reacting the polyol with the isocyanate.

TABLE I

| Example No.'s | Phosphorus Compound | Duration | With Propylene Oxide ||||| 
| --- | --- | --- | --- | --- | --- | --- | --- |
| | | | Viscosity (cps. at 25° C.) | Cream Time (sec's.) | Rise Time (sec's.) | Tack Time (sec's.) | Foam Height (inches) |
| 1, 2 | Tris(dipropylene glycol) phosphite | Initial | 1,556 | 25 | 125 | 105 | 4¾ |
| | | 1 Month at 50° C | 2,420 | 25 | 120 | 90 | 4⅛ |
| | | 2 Months at 50° C | 2,044 | 25 | 120 | 95 | 4½ |
| | | 3 Months at 50° C | 2,132 | 25 | 120 | 90 | 4½ |
| | | 3 Months at 25° C | 1,804 | 25 | 110 | 100 | 4¾ |
| 3, 4 | Phosphonate A | Initial | 1,224 | 25 | 180 | 180 | 4¾ |
| | | 1 Month at 50° C | 1,604 | 30 | 180 | 190 | 4¾ |
| | | 2 Months at 50° C | 1,712 | 30 | 180 | 180 | 4½ |
| | | 3 Months at 50° C | 1,816 | 30 | 180 | 165 | 4½ |
| | | 3 Months at 25° C | 1,488 | 30 | 200 | 180 | 4¾ |
| 5, 6 | DPG Pentol Triphosphite (KM-3) | Initial | 1,708 | 25 | 120 | 105 | 4⅝ |
| | | 1 Month at 50° C | 2,170 | 25 | 120 | 90 | 4¾ |
| | | 2 Months at 50° C | 2,530 | 25 | 117 | 105 | 4⅜ |
| | | 3 Months at 50° C | 2,900 | 25 | 125 | 95 | 4¼ |
| | | 3 Months at 25° C | 2,440 | 20 | 120 | 90 | 4½ |
| 7, 8 | DPG Heptol Pentaphosphite | Initial | 1,912 | 30 | 115 | 100 | 4¾ |
| | | 1 Month at 50° C | 2,768 | 20 | 120 | 90-105 | 4¾ |
| | | 2 Months at 50° C | 2,532 | 20 | 113 | 95 | 4¾ |
| | | 3 Months at 50° C | 2,608 | 25 | 120 | 90 | 4⅝ |
| | | 3 Months at 25° C | 2,348 | 25 | 125 | 90 | 4½ |
| 9, 10 | Tris(diethylene glycol) Phosphite | Initial | 1,208 | 25 | 120 | 100 | 4½ |
| | | 1 Month at 50° C | 1,836 | 25 | 105 | 70 | 4½ |
| | | 2 Months at 50° C | 1,652 | 25 | 105 | 90 | 4 |
| | | 3 Months at 50° C | 1,912 | 25 | 105 | 75 | 4¼ |
| | | 3 Months at 25° C | 1,588 | 25 | 100 | 70 | 4¾ |
| 11, 12 | Triethyl Phosphite | Initial | 198 | 25 | 125 | 100 | 6 |
| | | 1 Month at 50° C | 248 | 25 | 113 | 85 | 4¾ |
| | | 2 Months at 50° C | 270 | 25 | 135 | 85 | 4¾ |
| | | 3 Months at 50° C | 284 | 25 | 130 | 90 | 5 |
| | | 3 Months at 25° C | 226 | 25 | 115 | 85 | 5 |

| Example No.'s | Phosphorus Compound | Duration | Without Propylene Oxide ||||| 
| --- | --- | --- | --- | --- | --- | --- | --- |
| | | | Viscosity (cps. at 25° C.) | Cream Time (sec's.) | Rise Time (sec's.) | Tack Time (sec's.) | Foam Height (inches) |
| 1, 2 | Tris(dipropylene glycol) phosphite | Initial | 1,744 | 25 | 120 | 105 | 4¾ |
| | | 1 Month at 50° C | 2,376 | 25 | 230 | 190 | 4 |
| | | 2 Months at 50° C | 2,928 | 30 | 300+ | | |
| | | 3 Months at 50° C | 3,248 | 30 | 300+ | | |
| | | 3 Months at 25° C | 2,088 | 30 | 155 | 120 | 4½ |
| 3, 4 | Phosphonate A | Initial | 1,584 | 20 | 155 | 155 | 4½ |
| | | 1 Month at 50° C | 1,824 | 25 | 230 | 230-280 | 4⅝ |
| | | 2 Months at 50° C | 1,884 | 30 | 260 | 240-300 | 4¼ |
| | | 3 Months at 50° C | 1,952 | 30 | 230 | 255 | 4¼ |
| | | 3 Months at 25° C | 1,776 | 25 | 215 | 220 | 4⅜ |
| 5, 6 | DPG Pentol Triphosphite (KM-3) | Initial | 2,085 | 25 | 110 | 85 | 4½ |
| | | 1 Month at 50° C | 2,510 | 25 | 300+ | | |
| | | 2 Months at 50° C | 3,290 | 30 | 300+ | | |
| | | 3 Months at 50° C | 4,620 | 30 | 300+ | | |
| | | 3 Months at 25° C | 2,660 | 25 | 165 | 120 | 4½ |
| 7, 8 | DPG Heptol Pentaphosphite | Initial | 2,416 | 30 | 110 | 80 | 4½ |
| | | 1 Month at 50° C | 2,964 | 30 | 300+ | | |
| | | 2 Months at 50° C | 3,470 | 30 | 300+ | | |
| | | 3 Months at 50° C | 3,940 | 35 | | | |
| | | 3 Months at 25° C | 2,552 | 30 | 160 | 110 | 4⅝ |
| 9, 10 | Tris(diethylene glycol) Phosphite | Initial | 1,516 | 25 | 115 | 95 | 4½ |
| | | 1 Month at 50° C | 2,404 | 25 | 300+ | | |
| | | 2 Months at 50° C | 2,576 | 25 | 300+ | | |
| | | 3 Months at 50° C | 2,712 | 30 | | | |
| | | 3 Months at 25° C | 2,024 | 30 | 195 | 180 | 4½ |
| 11, 12 | Triethyl Phosphite | Initial | 217 | 30 | 105 | 75 | 5½ |
| | | 1 Month at 50° C | 422 | 25 | 188 | 215 | 4¼ |
| | | 2 Months at 50° C | 517 | 30 | 235 | 235 | 4½ |
| | | 3 Months at 50° C | 533 | 30 | 235 | 255 | 4⅜ |
| | | 3 Months at 25° C | 268 | 23 | 130 | 95 | 4½ |

Examples 13-26

A series of polyol compositions were produced from the formulation described in Examples 1-12, using tris(dipropylene glycol) phosphite as the phosphorus compound. Various epoxides were added to the polyol compositions in order to evaluate the effectiveness of the epoxides in stabilizing the polyol against loss of reactivity in urethane-forming reactions. The evaluation was conducted in the same manner as that described in Examples 1-12. The epoxides were employed in amounts of 0.0172 equivalent of epoxide group per 100 parts by weight of polyol (this amount corresponds to 1 part by weight of propylene oxide per 100 parts by weight of polyol). The epoxides used were as follows:

| Example | Epoxide |
| --- | --- |
| 13 | None. |
| 14 | 1,2-propylene Oxide. |
| 15 | Epichlorohydrin. |
| 16 | Epoxide A, i.e., the diglycidyl ether of 2,2-bis(para-hydroxyphenyl)propane. |
| 17 | Styrene Oxide. |
| 18 | Epoxide B, i.e., 1-vinyl-3,4-epoxycyclohexane. |
| 19 | Epoxide C, i.e., 3,4-epoxy-6-methylcyclohexylmethyl 3,4-epoxy-6-methylcyclohexanecarboxylate. |
| 20 | Epoxide D, i.e., vinylcyclohexene dioxide 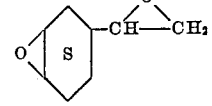 |
| 21 | Epoxide E, i.e., a mixture of compounds of the formula 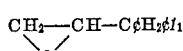 |
| 22 | Ethylene Oxide. |
| 23 | Epoxide F, i.e., Bis(2,3-epoxy-cyclopentyl) ether. |
| 24 | Epoxide G, i.e., epoxidized soybean oil. |
| 25 | Epoxide H, i.e., 2-ethylhexyl epoxy-tallate (epoxidized 2-ethylhexyl ester of tall oil acids). |
| 26 | Epoxide I, i.e., a compound of the formula 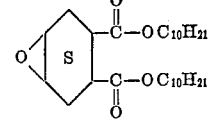 |

The results of the evaluations are displayed in Table II, below.

The foregoing examples demonstrate the ability of various epoxides to stabilize polyol-catalyst mixtures against loss of reactivity toward isocyanates.

(1) tris(polyalkylene glycol) phosphites of the formula:

TABLE II

| Example No. | Epoxide | Duration | Viscosity (cps. at 25° C.) | Cream Time (sec's.) | Rise Time (sec's.) | Tack Time (sec's.) | Foam Height (inches) |
|---|---|---|---|---|---|---|---|
| 13 | None | Initial | 1,744 | 25 | 120 | 105 | 4¾ |
|  |  | 1 Month at 50° C | 2,376 | 25 | 230 | 190 | 4 |
|  |  | 2 Months at 50° C | 2,928 | 30 | 300+ |  |  |
|  |  | 3 Months at 50° C | 3,248 | 30 |  |  |  |
|  |  | 3 Months at 25° C | 2,088 | 30 | 155 | 120 | 4½ |
| 14 | Propylene Oxide | Initial | 1,556 | 25 | 125 | 105 | 4¾ |
|  |  | 1 Month at 50° C | 2,420 | 25 | 120 | 90 | 4⅛ |
|  |  | 2 Months at 50° C | 2,044 | 25 | 120 | 95 | 4½ |
|  |  | 3 Months at 50° C | 2,132 | 25 | 120 | 90 | 4½ |
|  |  | 3 Months at 25° C | 1,804 | 25 | 110 | 100 | 4¾ |
| 15 | Epichlorohydrin | Initial | 1,476 | 25 | 110 | 85 | 4½ |
|  |  | 1 Month at 50° C | 2,140 | 30 | 120 | 85 | 4⅛ |
|  |  | 2 Months at 50° C | 2,396 | 30 | 140 | 105 | 4¼ |
|  |  | 3 Months at 50° C | 2,508 | 25 | 145 | 100 | 4¼ |
|  |  | 3 Months at 25° C | 2,116 | 25 | 115 | 85 | 4½ |
| 16 | Epoxide A | Initial | 2,232 | 25 | 120 | 95 | 4½ |
|  |  | 1 Month at 50° C | 3,210 | 25 | 115 | 95 | 4⅜ |
|  |  | 2 Months at 50° C | 3,700 | 30 | 125 | 95 | 4½ |
|  |  | 3 Months at 50° C | 3,800 | 30 | 140 | 95 | 4¼ |
|  |  | 3 Months at 25° C | 2,936 | 25 | 120 | 95 | 4½ |
| 17 | Styrene Oxide | Initial | 1,328 | 25 | 120 | 95 | 4 |
|  |  | 1 Month at 50° C | 1,788 | 25 | 125 | 95 | 4½ |
|  |  | 2 Months at 50° C | 1,956 | 25 | 115 | 90 | 4½ |
|  |  | 3 Months at 50° C | 2,140 | 30 | 120 | 90 | 4 |
|  |  | 3 Months at 25° C | 1,752 | 25 | 115 | 85 | 4½ |
| 18 | Epoxide B | Initial | 1,332 | 20 | 110 | 80 | 4¼ |
|  |  | 1 Month at 50° C | 1,724 | 25 | 120 | 100 | 4½ |
|  |  | 2 Months at 50° C | 1,840 | 25 | 120 | 85 | 4½ |
|  |  | 3 Months at 50° C | 1,940 | 25 | 130 | 90 | 4¼ |
|  |  | 3 Months at 25° C | 1,576 | 30 | 150 | 115 | 4¼ |
| 19 | Epoxide C | Initial | 1,616 | 25 | 105 | 85 | 4⅜ |
|  |  | 1 Month at 50° C | 2,292 | 25 | 130 | 105 | 4½ |
|  |  | 2 Months at 50° C | 2,328 | 25 | 110 | 80 | 4½ |
|  |  | 3 Months at 50° C | 2,416 | 25 | 120 | 80 | 4¼ |
|  |  | 3 Months at 25° C | 2,020 | 25 | 145 | 105 | 4½ |
| 20 | Epoxide D | Initial | 1,472 | 25 | 100 | 80 | 4⅜ |
|  |  | 1 Month at 50° C | 2,016 | 30 | 110 | 85 | 4½ |
|  |  | 2 Months at 50° C | 2,216 | 25 | 100 | 80 | 4½ |
|  |  | 3 Months at 50° C | 2,436 | 25 | 110 | 80 | 4¼ |
|  |  | 3 Months at 25° C | 1,936 | 25 | 135 | 100 | 4½ |
| 21 | Epoxide E | Initial | 1,116 | 25 | 105 | 85 | 4½ |
|  |  | 1 Month at 50° C | 1,664 | 25 | 105 | 85 | 4¾ |
|  |  | 2 Months at 50° C | 1,884 | 25 | 105 | 80 | 4½ |
|  |  | 3 Months at 50° C |  |  |  |  |  |
|  |  | 3 Months at 25° C | 1,512 | 30 | 135 | 90 | 4½ |
| 22 | Ethylene Oxide | Initial | 1,352 | 25 | 120 | 100 | 4¾ |
|  |  | 1 Month at 50° C | 2,144 | 25 | 105 | 90 | 4¾ |
|  |  | 2 Months at 50° C | 2,088 | 25 | 105 | 85 | 4¼ |
|  |  | 3 Months at 50° C | 2,840 | 25 | 110 | 75 | 4 |
|  |  | 3 Months at 25° C | 2,012 | 25 | 105 | 70 | 4¼ |
| 23 | Epoxide F | Initial | 1,632 | 30 | 120 | 100 | 4½ |
|  |  | 1 Month at 50° C | 2,072 | 25 | 190 | 135 | 4¼ |
|  |  | 2 Months at 50° C | 1,988 | 25 |  |  |  |
|  |  | 3 Months at 50° C | 2,616 | 30 |  |  |  |
|  |  | 3 Months at 25° C | 1,732 | 30 | 160 | 115 | 4¼ |
| 24 | Epoxide G | Initial | 1,684 | 25 | 225 | 105 | 4½ |
|  |  | 1 Month at 50° C | 2,168 | 30 | 150 | 120 | 4¾ |
|  |  | 2 Months at 50° C | 2,416 | 30 | 200 | 170 | 4 |
|  |  | 3 Months at 50° C | 2,604 | 30 | 230 | 195 | 4 |
|  |  | 3 Months at 25° C | 1,928 | 30 | 175 | 135 | 4¼ |
| 25 | Epoxide H | Initial | 1,428 | 30 | 130 | 120 | 4½ |
|  |  | 1 Month at 50° C | 1,696 | 30 | 180 | 130–165 | 4 |
|  |  | 2 Months at 50° C | 1,876 | 30 | 210 | 180 | 3⅞ |
|  |  | 3 Months at 50° C | 2,244 | 30 | 255 | 225 | 3½ |
|  |  | 3 Months at 25° C | 1,624 | 30 | 170 | 125 | 4¼ |
| 26 | Epoxide I | Initial | 1,482 | 20 | 130 | 105 | 4½ |
|  |  | 1 Month at 50° C | 1,792 | 30 | 135 | 100 | 4 |
|  |  | 2 Months at 50° C |  | 30 | 145 | 105 | 4 |
|  |  | 3 Months at 50° C | 2,008 | 30 | 150 | 105 | 3⅞ |
|  |  | 3 Months at 25° C | 1,688 | 30 | 160 | 110 | 4¼ |

What is claimed is:

1. A stabilized polyol composition suitable for reacting with an organic polyisocyanate to produce a urethane polymer, which comprises:
   (a) a polyol having an average hydroxyl number in the range of from about 20 to about 1000,
   (b) an organic phosphorus-containing composition in an amount sufficient to improve the flame resistance of said urethane polymer, said organic phosphorus-containing composition being selected from the group consisting of:

wherein each R individually represents alkylene of from 2 to 4 carbon atoms, and wherein $n$ represents a number having an average value of from 2 to about 50;

(2) poly(alkylene glycol phosphite) esters of the formula:

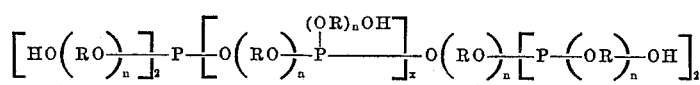

wherein each R individually represent alkylene of from 2 to 4 carbon atoms, wherein $n$ represents a number having an average value of from 2 to about 50, and wherein $x$ is a number having an average value of from 0 to about 20;

(3) tertiary phosphites of the formula:

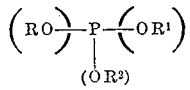

wherein R, $R^1$ and $R^2$ individually represent alkyl, aralkyl, haloalkyl, aryl, alkaryl, haloaryl, and 2 of the R, $R^1$ or $R^2$ variables together represent a 2 or 3 carbon chain in a 5- or 6-membered heterocyclic ring;

(4) the reaction product of the tertiary phosphites defined in (3) with a polyol;

(5) alkylene oxide adducts of phosphonic acid that are represented by the formula:

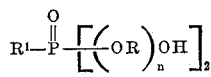

wherein $R^1$ represents alkyl, haloalkyl, aryl, haloaryl, alkaryl, or aralkyl of up to 20 carbon atoms, wherein R represents alkylene of from 2 to 4 carbon atoms, and wherein $n$ represents a number having an average value of from 1 to about 50;

(6) pentaerythritol phosphites;

(7) O,O' - disubstituted N,N - bis(hydroxyalkyl) amino-alkylphosphonates of the formula:

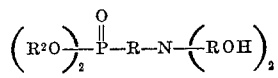

wherein each $R^2$ individually represents alkyl, aryl, hydroxyalkyl, or haloalkyl of up to 10 carbon atoms, and wherein each R individually represents alkylene of up to 6 carbon atoms; and (8) diphosphonates of the formula:

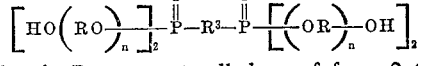

wherein R represents alkylene of from 2 to 4 carbon atoms, wherein $R^3$ represents lower alkylene of up to 10 carbon atoms, and wherein $n$ represents a number having an average value of from 1 to about 50;

(c) an organotin compound in an amount sufficient to catalyze the reaction of said polyol with an organic polyisocyanate, and (d) a small amount of a vicinal epoxide sufficient to stabilize the polyol-organotin compound mixture against loss of reactivity towards organic polyisocyanates.

2. The stabilized composition of claim 1 wherein said composition also contains a tertiary amine in an amount sufficient to catalyze the reaction of said polyol with an organic polyisocyanate.

3. The stabilized composition of claim 2 wherein the phosphorus compound is tris(polyalkylene glycol) phosphite.

4. The stabilized composition of claim 3 wherein said tris(polyalkylene glycol) phosphite is tris(dipropylene glycol) phosphite.

5. The stabilized composition of claim 2 wherein the phosphorus compound is a phosphite of the formula:

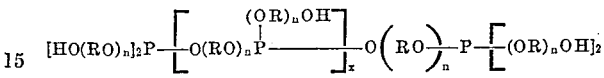

wherein each R individually represents an alkylene group of from 2 to 4 carbon atoms, wherein $n$ represents a number having an average value of at least 2, and wherein $x$ represents a number having an average value of from zero to twenty.

6. The stabilized composition of claim 2 wherein the epoxide is a lower alkylene oxide.

7. The stabilized composition of claim 6 wherein said alkylene oxide is 1,2-propylene oxide.

8. The stabilized composition of claim 2 wherein the epoxide is the diglycidyl diether of 2,2-bis(para-hydroxyphenyl)propane.

9. The stabilized composition of claim 2 wherein the epoxide is bis(2,3-epoxycyclopentyl) ether.

10. The stabilized composition of claim 2 wherein the epoxide is a compound of the formula:

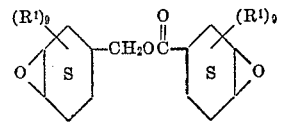

wherein each $R^1$ individually represents a member selected from the group consisting of hydrogen and alkyl of from 1 to 4 carbon atoms.

11. The stabilized composition of claim 2 wherein the epoxide is 3,4-epoxy-6-methylcyclohexylmethyl 3,4-epoxy-6-methylcyclohexanecarboxylate.

12. The stabilized composition of claim 2 wherein said epoxide is vinyl cyclohexene dioxide.

References Cited
FOREIGN PATENTS 726,787  1/1966  Canada.

MURRAY KATZ, *Primary Examiner.*

LEON D. ROSDOL, *Examiner.*

S. D. SCHWARTZ, *Assistant Examiner.*